(12) United States Patent
Villaret et al.

(10) Patent No.: US 7,904,429 B2
(45) Date of Patent: Mar. 8, 2011

(54) SYSTEM AND METHOD FOR SEARCHING STRINGS OF RECORDS

(75) Inventors: Yves Villaret, Hedera (IL); Shaul Ben Haim, Jerusalem (IL)

(73) Assignee: Robogroup T.E.K. Ltd, Rosh Haayin (IL)

( * ) Notice: Subject to any disclaimer, the term of this patent is extended or adjusted under 35 U.S.C. 154(b) by 533 days.

(21) Appl. No.: 11/568,746

(22) PCT Filed: May 8, 2005

(86) PCT No.: PCT/IL2005/000482
§ 371 (c)(1),
(2), (4) Date: Jul. 21, 2008

(87) PCT Pub. No.: WO2005/109305
PCT Pub. Date: Nov. 17, 2005

(65) Prior Publication Data
US 2009/0012957 A1    Jan. 8, 2009

(30) Foreign Application Priority Data
May 7, 2004    (IL) .......................................... 161874

(51) Int. Cl.
*G06F 17/00* (2006.01)
(52) U.S. Cl. .................... 707/687; 707/689; 707/696
(58) Field of Classification Search ............. 707/999.01, 707/999.003, 999.101
See application file for complete search history.

(56) References Cited

U.S. PATENT DOCUMENTS

| 4,118,788 | A | * | 10/1978 | Roberts ................. 707/999.003 |
| 5,032,987 | A | | 7/1991 | Broder |
| 5,386,469 | A | | 1/1995 | Yearsley et al. |
| 5,406,278 | A | | 4/1995 | Graybill et al. |
| 5,450,595 | A | | 9/1995 | Chen et al. |
| 6,167,047 | A | | 12/2000 | Welfeld |
| 6,169,969 | B1 | | 1/2001 | Cohen |

(Continued)

FOREIGN PATENT DOCUMENTS
WO   PCT/IL2001/000915       4/2003

(Continued)

OTHER PUBLICATIONS

Anand, Integrating Observer and Intermedia: A Case Study, 1990, pp. 1-15.*

*Primary Examiner* — Charles Rones
*Assistant Examiner* — Rezwanul Mahmood
(74) *Attorney, Agent, or Firm* — Gottlieb, Rackman & Reisman, P.C.

(57) ABSTRACT

System and method for detecting the inclusion of strings of words (records) in an input string of words. In a preparation phase, the records are pre-processed. Each record is represented by a string of chunks, each chunk composed of a pre-defined number of words. Each chunk found in at least one record is assigned a number of attributes, such as a "Begin of Record" attribute and an "End of Record" attribute. In the searching phase the input string is also divided in chunks, and for each input chunk, an Incremental Hash Function (IHF) is calculated for comparing with a prerecorded value ΔI. If the two values IHF and ΔI coincide for matching chunks with certain predefined attributes, a "probable match" is set, indicating a very high probability that a chunk was found in the records.

28 Claims, 14 Drawing Sheets

U.S. PATENT DOCUMENTS

| | | | |
|---|---|---|---|
| 6,182,142 B1 * | 1/2001 | Win et al. | 709/229 |
| 6,212,525 B1 * | 4/2001 | Guha | 707/999.101 |
| 6,377,945 B1 | 4/2002 | Risvik | |
| 6,453,327 B1 * | 9/2002 | Nielsen | 715/205 |
| 6,625,612 B1 | 9/2003 | Tal et al. | |
| 6,721,749 B1 * | 4/2004 | Najm et al. | 707/999.1 |
| 6,738,779 B1 | 5/2004 | Shapira | |
| 7,110,540 B2 * | 9/2006 | Rajagopal et al. | 707/999.101 |
| 7,120,630 B2 | 10/2006 | Bass et al. | |
| 7,464,103 B2 * | 12/2008 | Siu et al. | 707/999.101 |
| 7,519,903 B2 * | 4/2009 | Yahagi | 707/999.101 |
| 7,548,928 B1 * | 6/2009 | Dean et al. | 707/999.101 |
| 7,610,283 B2 * | 10/2009 | Arasu et al. | 707/999.001 |
| 7,698,325 B1 * | 4/2010 | Ozekinci et al. | 707/698 |
| 7,734,595 B2 * | 6/2010 | Margolus | 707/687 |
| 2002/0032787 A1 * | 3/2002 | Overton et al. | 707/10 |
| 2002/0038319 A1 * | 3/2002 | Yahagi | 707/100 |
| 2002/0049760 A1 * | 4/2002 | Scott et al. | 707/10 |
| 2003/0009453 A1 | 1/2003 | Basso et al. | |
| 2004/0073534 A1 * | 4/2004 | Robson | 707/1 |
| 2005/0144469 A1 * | 6/2005 | Saitoh | 713/189 |
| 2006/0015945 A1 * | 1/2006 | Fields | 726/27 |
| 2007/0078848 A1 * | 4/2007 | Sareen et al. | 707/3 |
| 2007/0100834 A1 * | 5/2007 | Landry et al. | 707/10 |
| 2007/0248241 A1 * | 10/2007 | Nagao | 382/100 |
| 2008/0005275 A1 * | 1/2008 | Overton et al. | 709/218 |
| 2009/0106441 A1 * | 4/2009 | Zuckerman et al. | 707/10 |
| 2009/0122351 A1 * | 5/2009 | Tsuchitoi | 358/3.28 |
| 2010/0111296 A1 * | 5/2010 | Brown et al. | 380/28 |

FOREIGN PATENT DOCUMENTS

WO PCT/US2003/015910  12/2003

* cited by examiner

H(HELL)=X1
H(ELLO)=X2
H(LLO-)=X3
H(LO-W)=X4
H(0-W0)=X5
H(-WOR)=X6
H(WORL)=X7
H(0RLD)=X4

| | | | | |
|---|---|---|---|---|
| 21 | H | E | L | L |
| 32 | E | L | L | O |
| 64 | L | L | O | - |
| _12_ | L | O | - | W |
| 91 | O | - | W | O |
| 74 | - | W | O | R |
| 51 | W | O | R | L |
| _12_ | O | R | L | D |

| | INDEX | BOR flag | EOR flag | EXISTS Flag |
|---|---|---|---|---|
| X5 → | * | 0 | 0 | 1 |
| | | | | 0 |
| | | | | 0 |
| X3 → | * | 0 | 0 | 1 |
| | | | | 0 |
| X7 → | * | 0 | 0 | 1 |
| | | | | 0 |
| X2 → | * | 0 | 0 | 1 |
| | | | | 0 |
| | | | | 0 |
| X1 → | * | 1 | 0 | 1 |
| | | | | 0 |
| X6 → | * | 0 | 0 | 1 |
| | | | | 0 |
| _X4_ → | _12_ | 0 | 1 | 1 |
| | | | | 0 |

Fig 7

| Chunk Data | Next-index | Previous index | BOR | EOR | Length | ΔI |
|---|---|---|---|---|---|---|
| 12 → WORL | 51 | 74 | 0 | 0 | | |
| 21 → HELL | 32 | 0 | 1 | 0 | | |
| 32 → ELLO | 64 | 21 | 0 | 0 | | |
| 51 → ORLD | 0 | 12 | 0 | 1 | 8 | ΔI1 |
| 57 → WORD | 0 | 74 | 0 | 1 | 4 | ΔI2 |
| 64 → LLO- | 12 | 32 | 0 | 0 | | |
| 72 → NO-W | 91 | 0 | 1 | 0 | | |
| 74 → -WOR | *0* | 91 | 0 | 0 | | |
| 91 → O-WO | 74 | *0* | 0 | 0 | | |

Fig 10

SYSTEM AND METHOD FOR SEARCHING STRINGS OF RECORDS

FIELD OF THE INVENTION

This patent relates to systems used for searching, in an input string of data, the potential inclusion of a pre-defined string(s) (record(s)) from a given list of such pre-defined strings. Such systems are used for example in communication devices and on different communication networks such as the Internet for virus detection, intrusion detection and other applications. Where the list of records is considerably large, the time required for detecting the inclusion of one or several records in the input string is prolonged. In a communication line, data may be transmitted at a very high rate, and checking the presence of viruses or other records at wire speed may become very expensive or not feasible. It is thus desirable to design a system that is capable to detect the presence of records in an input string, by a process that operates at high speed and relatively low cost.

BRIEF DESCRIPTION OF THE FIGURES

In order to understand the invention and to see how it may be implemented in practice, a plurality of preferred embodiments will now be described, by way of non-limiting example only, with reference to the accompanying drawing, in which

FIG. 7 shows another variation of the hash table shown in FIG. 6, where three additional flags are stored;

FIG. 10 illustrates a Chunk Table for two records;

SUMMARY OF THE INVENTION

System and method for detecting the inclusion of strings of words (records) in an input string of words. In a preparation phase, the records are pre-processed. Each record may be represented by a string of chunks, a chunk being a section of a string that is composed of a pre-defined number of elementary words. During pre-processing, each chunk found in at least one record is assigned a number of attributes, among them a "Begin of Record" attribute and an "End of Record" attribute.

In the searching phase the input string is also divided in chunks, and each chunk of the input string is searched in the records. If a searched chunk is found to be present in at least one record, then a Partial Match flag is set according to a logic calculation. For each input chunk, an Incremental Hash Function (IHF) is calculated.

Whenever a chunk from the input string with an "End of Record" is found to be in at least one of the records, and the Partial Match is set for this chunk, the difference of the IHF between that "End of Record" chunk and the correspondent "Begin of Record" chunk is compared with a pre-recorded value ΔI, calculated during the pre-processing and associated to the "End of Record" chunk. If the two values coincide, a "probable match" is set, indicating a very high probability for an exact match.

DETAILED DESCRIPTION OF THE INVENTION

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a novel system and method for detecting the inclusion of strings of words (records) in an input string of words.

Figure 1:
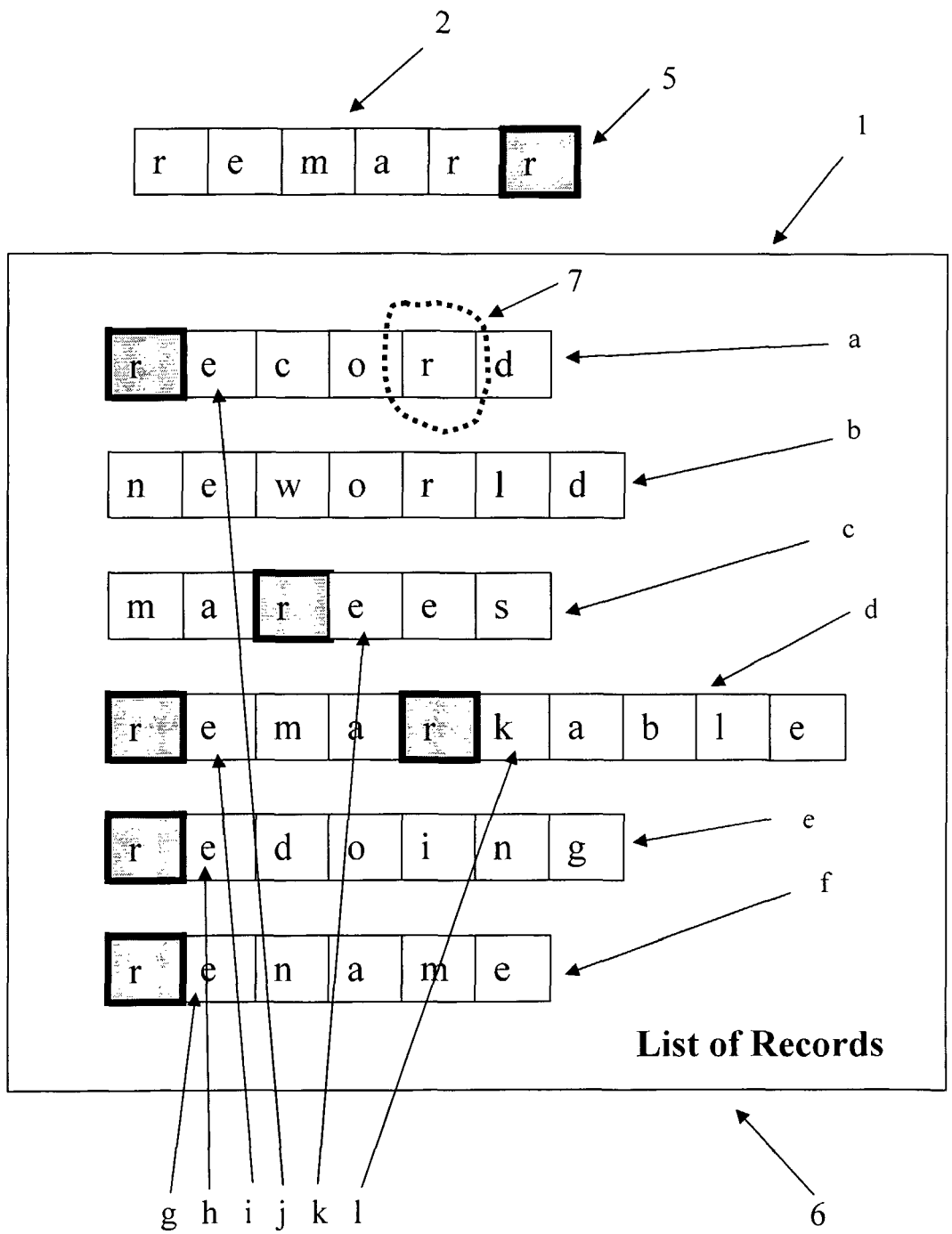
FIG. 1 shows prior art where evaluation of a plurality of partial matches must be processed through a plurality of records at each cycle.

Reference is made now to FIG. 1, representing the prior art, a list (6) of records a, b, c, d, e and f is shown. Each of the records a, b, c, d, e and f is composed of an ordered group of words wherein each word is represented by a square marked by a letter such as square (r), indicated by dotted circle (7). An input string (2) is also shown, also composed of an ordered group of words wherein the last word of the input string (2) is designated (5). The following is a description of the prior art method for checking whether some of the records are included in the input string, i.e. if there exists a contiguous portion of the input string that contains exactly the same words, and in the same order as one of the records. In accordance with existing methods, each word of the input string is sequentially checked. Checking a word of the input string includes the operations of:

Checking whether that word is the first word of a record, and in that case setting a partial match flag for that record at that word position.

For each record already having a partial match set at a particular word, checking if the word that is next to the said particular word of the said record in a predefined order (hereinafter: successive word) is the same as the word that is being checked. If it is, then setting a partial match word at the record word position of the said successive word, and asserting a match if the said successive word is the last of the record. In all cases, resetting the partial match of the previous word.

These operations must be done at each word input, for a plurality of record positions. In the example of FIG. 1, six word positions (g, h, i, j, k, l) must be checked when the word "r" (5) ending the string of words "r" "e" "m" "a" "r" "r" is input to the system. These positions must be checked, either because the word "r" is the beginning of record as in positions g, j, i and j, of FIG. 1 or because the partial match reached the word previous to the word "r" in the record as in positions k and l of FIG. 1. In FIG. 1, bolded squares indicate positions in the records for which a partial match was set.

If the number of records is large, and the possible values for a word are limited, then each word will be present in many records, and a very large number of positions must be checked in the record list at each input of one word from the input string. Accordingly, the operation speed of such a system will be limited to relatively low value. An attempt to increase the operation speed of such systems is described in PCT/IL 01/00915, the method of PCT/IL 01/00915 requiring the use of expensive dedicated integrated circuits. In other systems a State machine is used, having the drawback that the amount of memory required to pre-record all possible states increases rapidly with the amount of records.

The present invention overcomes the drawbacks of the prior art. As will be shown, the list of records is represented by a new data structure (Chunk Table), for each input of one chunk of the input string an index to a unique position in the Chunk Table is defined, and a set of logic operations is performed on data stored at that position only. Due to the advantages of the inventive method, the said logic operations may be performed in a single cycle or a relatively small number of cycles whereby operation speed can be considerably increased. It is a further advantage of the inventive method that it may be implemented in dedicated hardware, such as Field Programmable Gate Arrays (FPGA) or ASIC's thereby increasing speed while reducing costs of the system. The preferred embodiments described here refer to FPGA and ASIC, however the system and method described can also be implemented in software. An advantageous feature of the inventive system is the issuance of a "Probable Match" flag, indicating a very high probability that a record is included in the input string. A tag or index indicating the record(s) for which a "Probable Match" was found may also be issued. Optionally, verification means can be added to the inventive system, so that when a "Probable Match" is generated, it can be determined whether it is an "Exact Match", i.e. whether the record for which a "Probable Match" was found is in fact included in the input string.

A particular advantage of the inventive system is that it does not allow for any miss, i.e. if a record is included in the input string, then a Probable Match will be generated. On the other hand, if the verification means are not implemented, there may be "False Alarms", i.e. a Probable Match was generated, but the record for which that Probable Match was generated is not actually included in the input string.

It is a further advantage of the inventive system that it can be designed such that the probability of a "False Alarm" becomes very low, and even negligible. In that case, verification means are not required, resulting in lower cost.

It is another advantage of the inventive system that the amount of memory required to store the Chunk Table only grows in an almost linear manner with the amount of words in the records.

Yet another advantage is that the inventive system and method can be implemented using existing components and means, like memory, FPGA's, ASIC's and even software.

One embodiment of the present invention is related to a method for detecting the inclusion of strings of records in an input string of words comprising the following steps: pre-processing the records in the manner that at least a portion of the records are represented by a string, comprising a plurality of sections composed of a pre-defined number of elementary words (chunks), in the manner that wherein a chunk is found in at least one record is assigned a number of attributes, selected from a "Begin of Record" attribute and an "End of Record" attribute; searching said string in the manner that the input string is divided into a plurality of chunks, so that each chunk of the input string is searched in the records; if a searched chunk is found to be present in at least one record, a Partial Match Flag is set according to a logic calculation; and then calculating an Incremental Hash Function (IHF) for each input chunk. This method is characterized by that whenever a chunk from the input string with an "End of Record" is found to be in at least one of the records, and the Partial Match is set for this chunk, the difference of the IHF between that "End of Record" chunk and the correspondent "Begin of Record" chunk is compared with a pre-recorded value $\Delta I$, calculated during the pre-processing and associated to the "End of Record" chunk. It is further characterized by that whenever the said two values coincide, a "probable match" is set, indicating a very high probability for an exact match. It is acknowledged in this respect that at least a portion of the records may be words, numbers, notes or characters.

Figure 2:
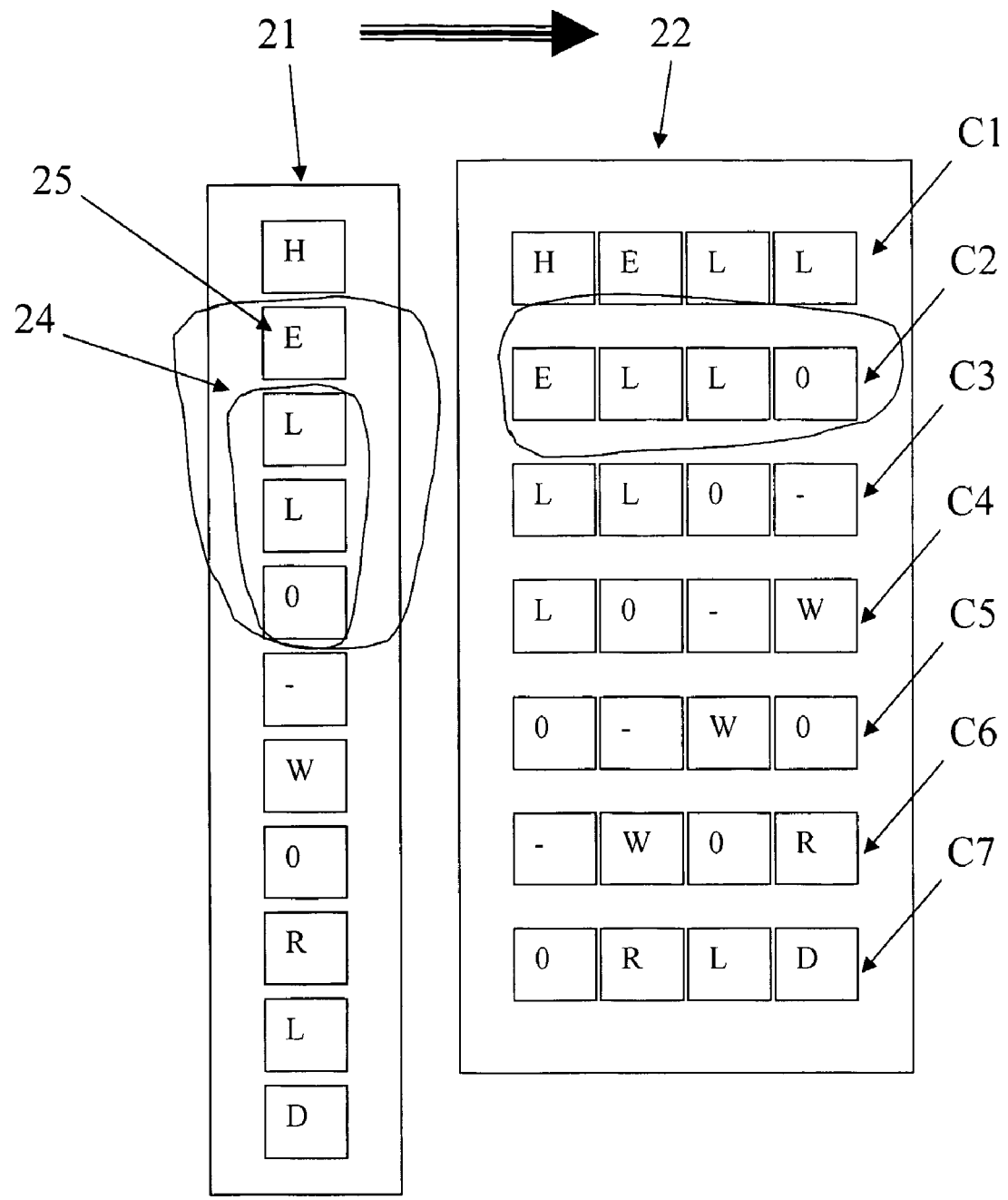
FIG. 2 shows how a string of elementary words is represented in the form of another string of overlapping longer words (Chunks)

In FIG. 2, it is shown how a string of words (21) can be represented as a string (22) of longer words (Chunks), each Chunk consisting of (i) words. In the process of dividing the string of words (21) into chunks, to each word the (i−1) successive words of the said string (21) are associated whereby a Chunk is created In FIG. 2 for example, i=4, and a Chunk (c2) is formed by associating to the word E the 3 successive words L, L, O, encircled in FIG. 2 by dotted circle (24) such that a Chunk E, L, L, O is created, encircled in FIG. 2 by dotted circle (25). The string (21) is now represented by a new string of Chunks (22), each Chunk being composed of i words. In FIG. 2, an example with i=4 is shown, and the string of eleven words is represented as a string of seven Chunks C1, C2, C3, C4, C5, C6 and C7. The arrow of FIG. 2 indicates that the string of eleven words (21) is converted into the string of Chunks (22). It will be understood however that the invention may be implemented by choosing a different value of i such as i=3, i=5 etc.

The purpose of this representation is to use longer words, such that the number of possible values for each chunk is much higher than the number of values for each word, and the probability of finding a given Chunk in several records of the record list is significantly reduced. This manner of representing a string will be referred to herein below as "Chunk Representation" of a string.

It will be understood that using Chunk Representation will make the inventive method and system more efficient, other embodiments can be implemented without using the Chunk Representation, in which case an increased number of "False Alarms" are likely to be generated, requiring additional verification time when a "Probable Match" is found.

Figure 3:
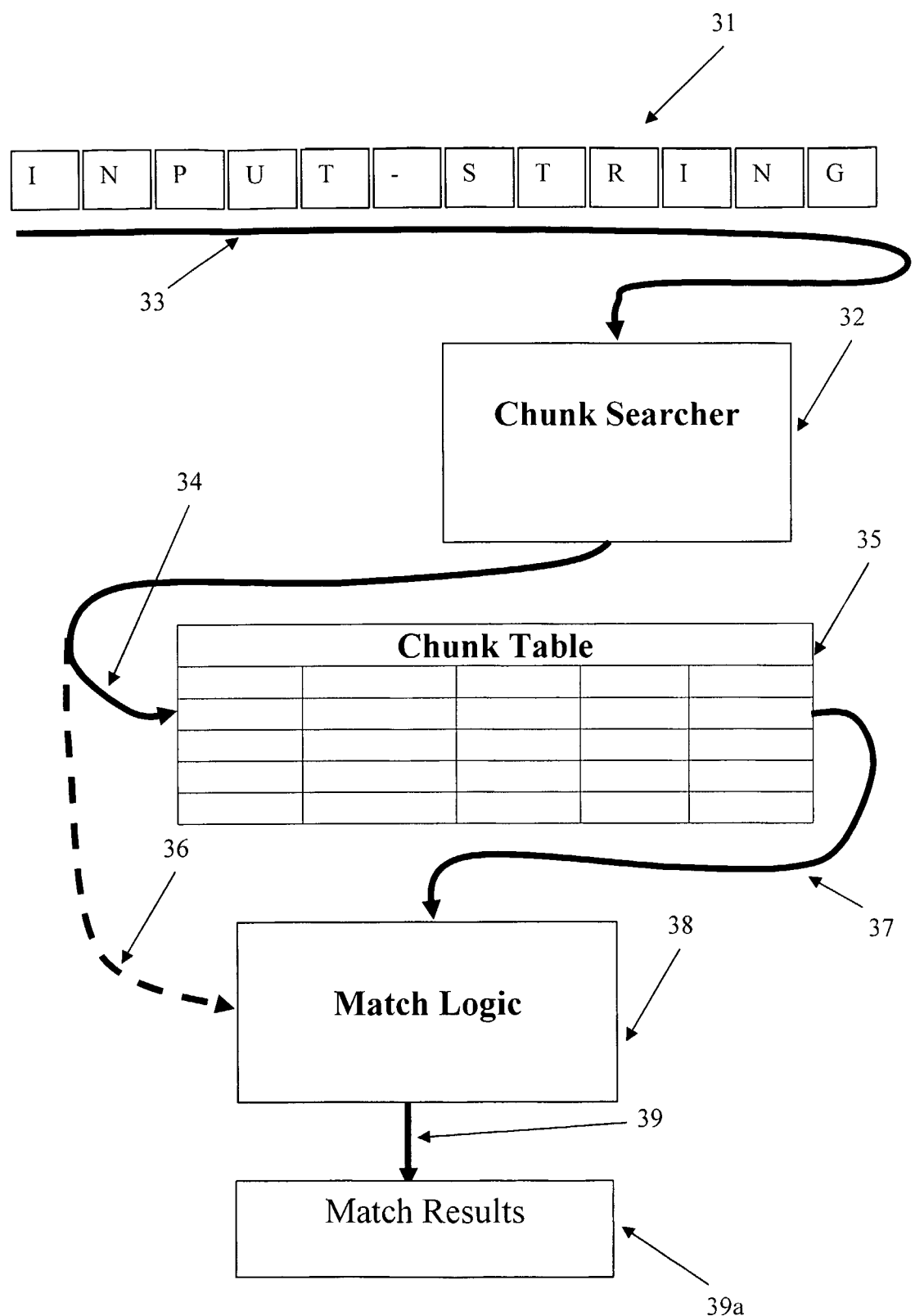
FIG. 3 shows a general block diagram of the inventive system.

In FIG. 3, a general block diagram of the inventive system is shown. An input string (31) is input to a "Chunk Searcher" (32) as indicated by arrow (33). The Chunk Searcher transforms the input string into a string of chunks, and then executes a search operation for each Chunk of the Chunk Representation of the input string. The result of the search operation is an index (34) pointing to a row in a Chunk Table (35) if that Chunk is found in at least one record. In case the Chunk is not found in any record a Null index (36) is issued to the Match Logic (38). In the Chunk Table (35), a number of attributes are stored at each row. In a first embodiment, one row is defined for each Chunk of the records. In other embodiments, several Chunks may lead to the same row of the Chunk Table.

The data of the attributes stored in the Chunk Table row are input to the Match Logic block (38) as indicated by arrow (37). The Match Logic block (38) is designed to perform logic combination on these data, and on the results of logic operations executed at previous Chunk Inputs. The Match Logic operation will be explained in detail later.

As indicated by arrow (39) the Match Logic block (38) issues Match Results (39a), including Probable Match and a record tag or index, indicating the record(s) for which the probable match is issued.

In this general block diagram, the nature of the Chunk Searcher is not detailed, and any existing techniques can be used, like for example Hashing, or Content Addressable Memories.

Figure 4:
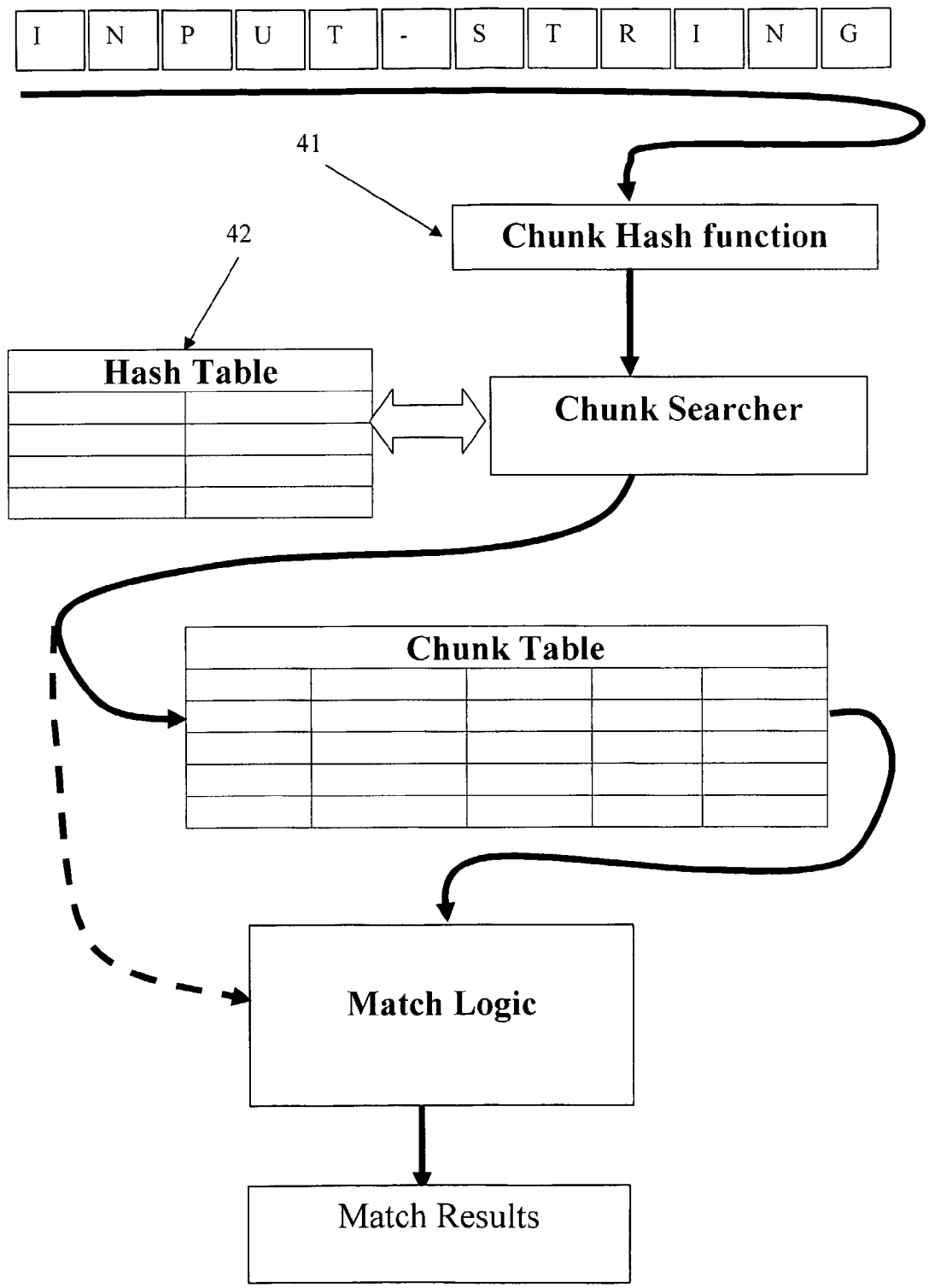
FIG. 4 shows the same block diagram where a Chunk searching system using the Hashing technique is implemented.

In FIG. 4 a general block diagram is shown, where a Hash function (41) and a Hash Table (42) are used by the Chunk Searcher. The block diagram is very similar to that of FIG. 3, the Chunk Searcher in FIG. 4 being a specific implementation of a searcher that uses hashing technique.

Figure 5:
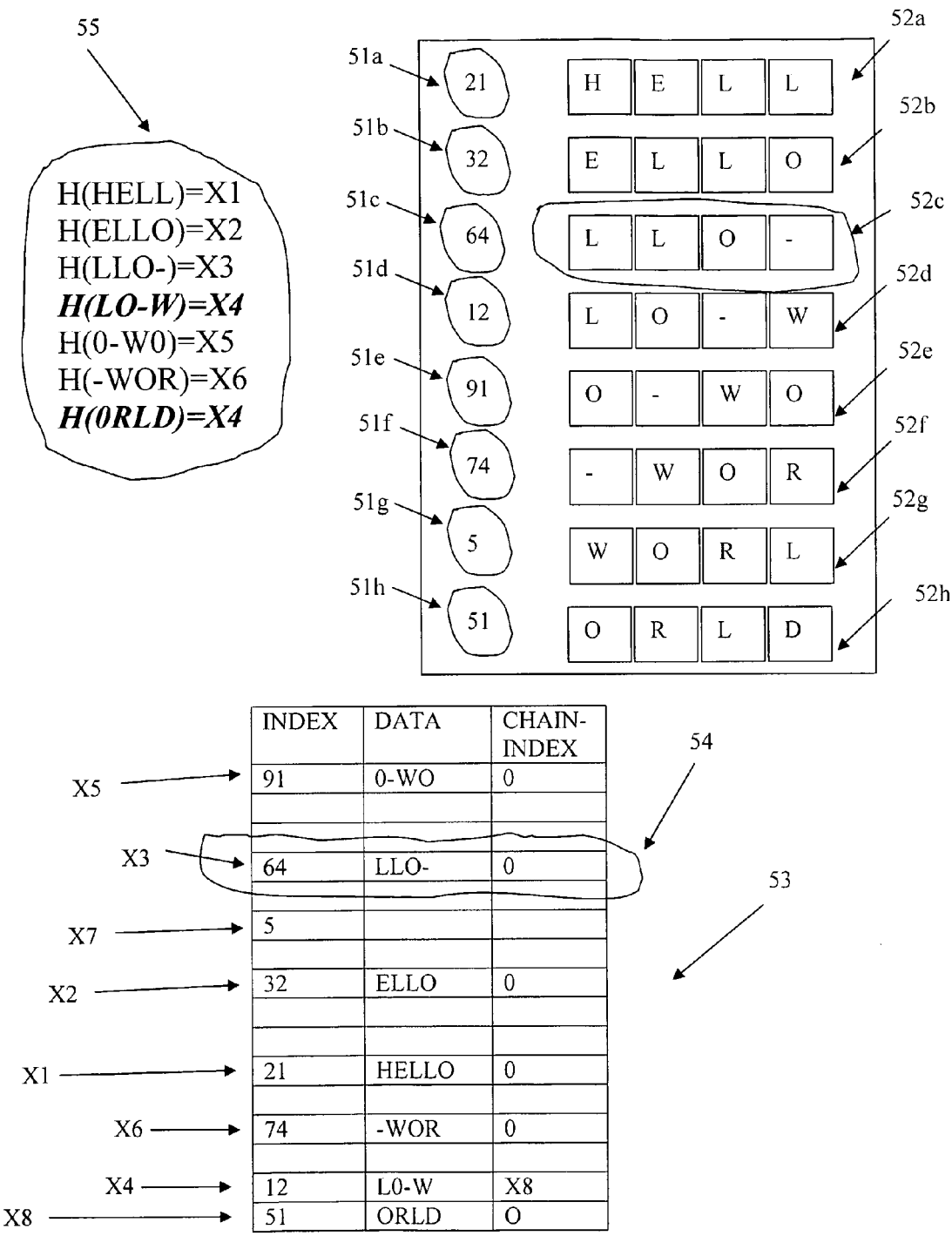
FIG. 5 shows a Hash Table applicable for a Chunk Searcher where data of chunks and a chain index are stored in Hash Table rows.

In FIG. 5 an embodiment of the inventive method is shown, using a Hash function H(Chunk) (55) to search a Chunk. Any type of function may be chosen for the Hash function H(Chunk) (55). In a preparation phase, an arbitrary index is assigned to each Chunk of records. For each of the Chunks 52a, 52b, 52c, 52d, 52e, 52f, 52g, 52h one index (51a, 51b, 51c-51h) is defined. As shown in FIG. 5 by way of example an index 51a is defined for Chunk 52a, an index 51b is defined for Chunk 52b and so on. In the said preparation phase, the Hash function is applied to all the Chunks of all records and a Hash value X is defined for each of the said records. A Hash Table (53) is defined where the index of each Chunk is stored at a row in the table pointed to by the respective Hash value x. Thus by way of example dotted circle 54 is marked around such a row, pointed to by Hash value X3. Since the Hash function can be of any type, it is possible for two or several Chunks to generate the same Hash Value. As seen in FIG. 5, in order to enable finding the Chunk that matches the input Chunk, in each row are also prepared and stored the Chunk Data, i.e. the values of the Chunk words, and a Chain-Index. During the preparation phase, the various Chunks having the same Hash value will be stored in different rows of the hash table, and these rows will be pointed to by the Chain Indexes, so that the Chain Index points to another row storing a different Chunk for which the same Hash value is obtained. The calculated Hash value will then point to a first candidate for a matching Chunk, and then if the Chunk is not found, the search can be continued using the Chain Index. The Chunk Searcher will then execute the search in the following manner:

a. For each Chunk Input of the input string, applying the Hash function and obtaining a Hash Value x
b. Reading from row x of the Hash Table the Chunk Data stored at that row
c. Comparing the Stored Chunk Data with the Input Chunk
    If both are equal, then outputting the index stored in that row as an index to the Chunk Table
    If both are not equal, and if the Chain Index is not Null at that row, setting the value of x to be the Chain Index value and returning to b
    If both are not equal, and the Chain Index is Null, outputting a Null index In FIG. 5, an example is shown where the Chunks "LO-W" and "ORLD" produce the same Hash value x4. Accordingly, in the Hash Table (53), at the row pointed to by x4, data of Chunk "LO-W" is stored, and Chain Index x8 is stored that points to a row containing data of the Chunk "ORLD".

This Hashing technique is of common use in many systems, and variations to this basic idea may be used.

A particular feature of the present invention relies in the fact that only a "Probable Match" is asserted, and the system does not need to be designed to ensure a perfect match. This feature can be advantageously exploited by using a different Hash Technique, where an exact match is not ensured by the Chunk Searcher.

Figure 6:
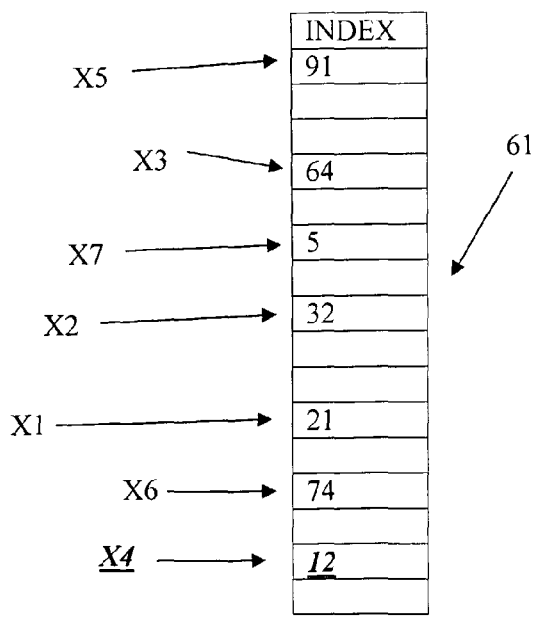
FIG. 6 shows a Hash Table applicable for a Chunk Searcher where the data of chunk and chain index are not stored and smaller memory space is required.

In FIG. 6, a second embodiment of the chunk searcher is shown using a smaller Hash Table (61) where the Chunk Data and the Chain Index are not stored. As in the previous embodiment, several Chunks may result in the same Index to the Chunk Table but there is no procedure for checking which of the two chunks with the same index has a match in the stored data. In the example of FIG. 6, the same index is used for Chunks "WORL" and "LO-W". Usage of such Hash Technique allows a significant reduction of the memory requirements of the system.

FIG. 7 shows another variation of the hash table of FIG. 6, where three additional flags are stored: a BOR flag, indicating a Chunk being the first of a record, an EOR flag, indicating a Chunk being the last of a record and an EXISTS flag, indicating that the Chunk appears in a record. During the preparation phase, each record Chunk is scanned and the said flags are updated at the row of the Hash table pointed to by the Hash value for that Chunk. In the case where the Chunk is not the last Chunk in any record, the value stored at Index column is indifferent. During the searching phase, at each input of a Chunk of the Input String, the Hash value x is calculated; if it points to an empty row of the Hash Table, it will indicate that the Chunk does not appear in any record. Checking that the row is empty is done by checking the EXISTS flag. Using this variation of the hash table allows the system to use a fewer number of memory fetch cycles, since the Chunk Table will be addressed only for Chunks having an EOR set. The use of the BOR flag is explained below.

Figure 8:
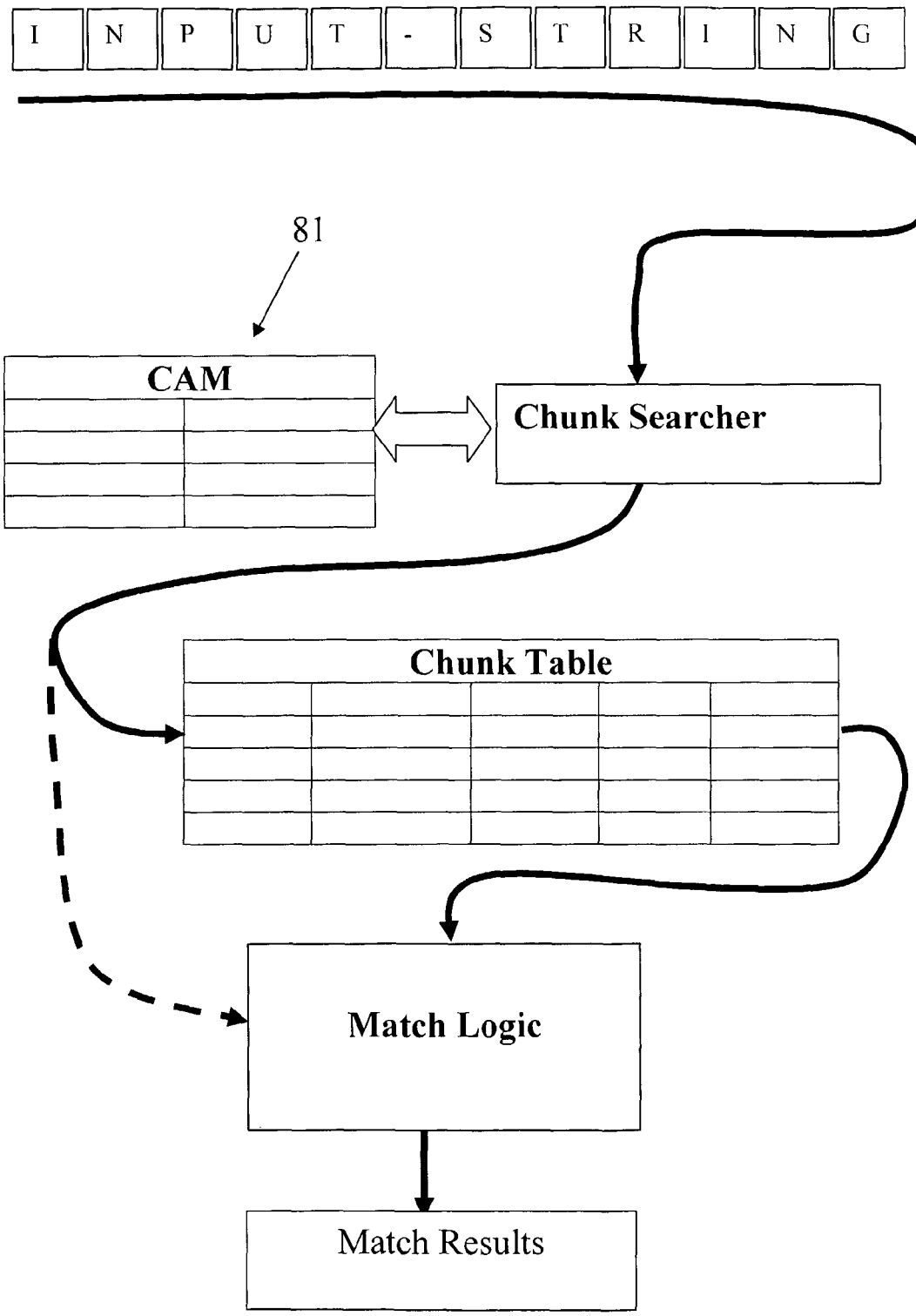
FIG. 8 shows a block diagram of the inventive system where a Chunk searcher using a Content Addressable Memory for searching the chunks is implemented.

FIG. 8 shows a general block diagram of a third embodiment comprising a Content Addressable Memory (CAM) and a Chunk Searcher. CAMs are specialized devices that are able of storing a list of strings, usually of fixed size. A CAM can execute at high speed the task of searching for the presence of an input string of the same size in the list of strings, and output an index to that string. These CAMs can deal with strings of limited size, and they can be used by the Chunk Searcher, since Chunks are of relative small size. In the preparation phase, the list of Chunks will be stored in the CAM, the index for each Chunk being now its position in the CAM array. In the searching phase, the Chunk Searcher will sequentially activate a CAM Search for each Chunk and output the Index returned by the CAM.

Figure 9:
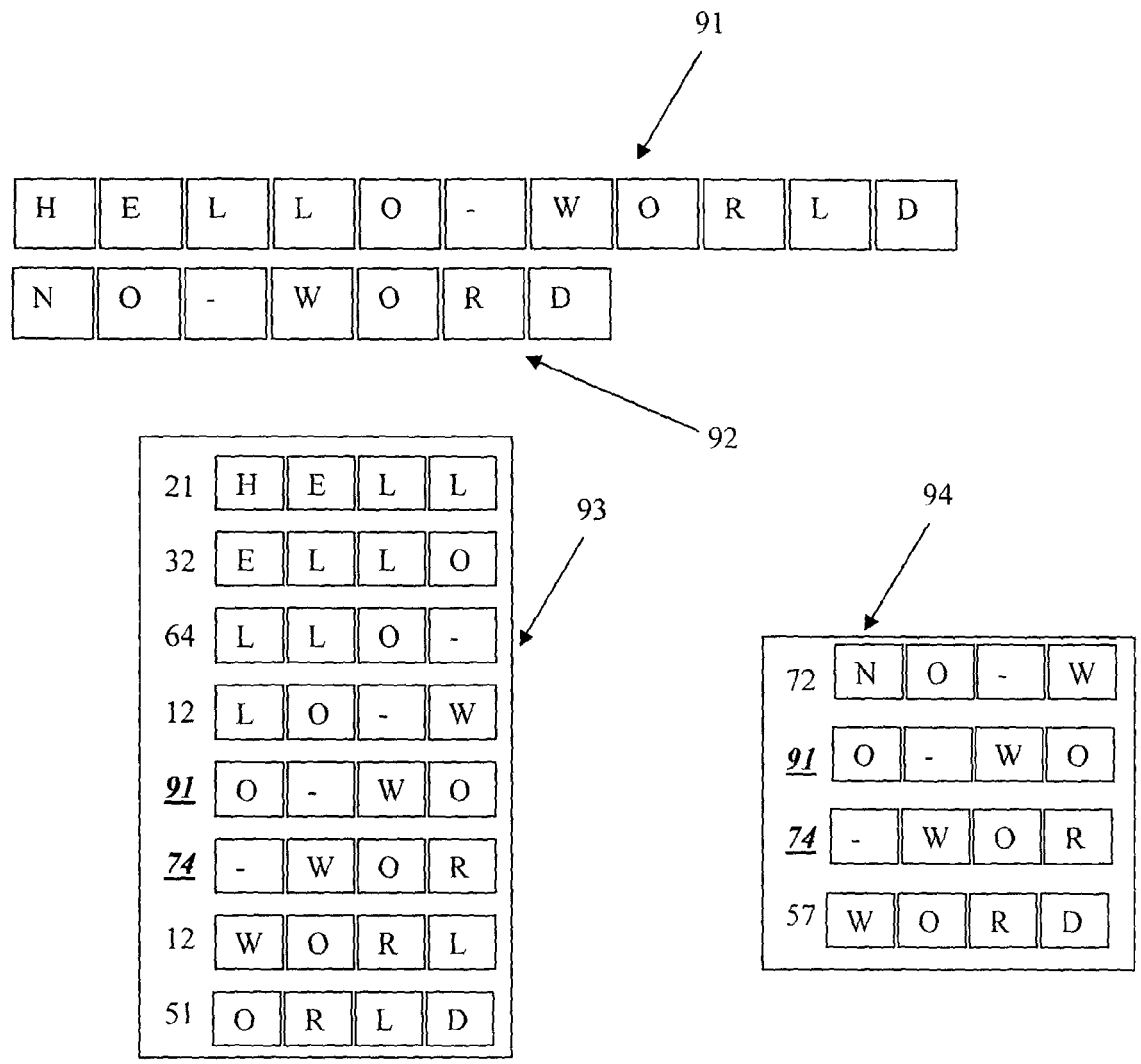
FIG. 9 shows how a single unique index is associated with each chunk, even in case that the chunk appears in several records.

FIG. 9 shows an example of how indexes may be assigned for each Chunk. In this particular example two Records (91, 92), having Chunk Representations (93) and (94) respectively, have in common Chunks "O-WO" and "-WOR", so that the indexes 91 and 74 appear in both string Chunk Representations. Indexes may be assigned in any way that is convenient. Thus by way of example they may be chosen to contain information on a feature of the record, or a feature of the Chunk.

FIG. 10 shows the rows of a Chunk Table where data attributes of the two strings (91) and (92) of FIG. 9 are stored. The Chunk Table of FIG. 10 is prepared by scanning all records during the preparation phase in order to find all Chunks and when a Chunk is encountered in a record, checking for a number of properties for that Chunk. The following properties may be included in the Chunk table:

If the Chunk is the first Chunk of a record, then a BOR flag is set for it. The same Chunk may appear in several records, and if it is the first Chunk of at least one record, the BOR flag is set for it. In other cases, the BOR flag is reset. In the example of FIG. 10, in rows 21 and 72 BOR is set since, as shown in FIG. 9, the Chunks "HELL" and "NO-W" are the first Chunks of records (91) and (92) respectively If the Chunk is the last Chunk of a record, an EOR flag is set. Since there may be several records that have the same Chunk as a last Chunk, additional attributes for that Chunk may be stored. The purpose of the additional attributes is to store additional information concerning the one or several records ending with that Chunk. This additional information will be used, during the searching phase, to compare pre-stored information about the records with information accumulated during the search, and thus reduce the probability of a False Alarm. In the scope of the embodiment of FIG. 10, the length of the record i.e. the number of Chunks in the record is stored. Also recorded in this embodiment, is a value $\Delta I$, which represent the sum of a Hash function that is calculated for all the chunks in that record, a Detailed description of the calculation of the $\Delta I$ value will be provided further on. In this particular embodiment, Length and $\Delta I$ form a set of verification values for the record. In case that several records have the same last chunk, or have different last chunks but pointing to the same row (this is possible in the embodiment of FIG. 6), a set of verification values, such as length and $\Delta I$, is stored in the respective rows for each of these records.

In the particular case described above and illustrated in FIG. 7, where the BOR and EOR flags are stored in the Hash Table, they can be omitted from the Chunk Table, and the values of these flags can be retrieved from the Hash Table.

Optional additional data can be recorded in each row for the purpose of reducing the probability of False alarm. These additional data can be used by the Match Logic to verify additional conditions for setting the Partial Match flag, and thus reduce the probability of False Alarms.

In FIG. 10 is shown a case where for each Chunk, the Chunk data and the indexes of the Previous and Following Chunk in the record are stored. Again, the same Chunk may be present in several records, so that it may happen that there are several possibilities for a "Next_index" or/and "Previous_index". In that case a Null Index will be stored. During the searching phase, the Match Logic will verify whether the pre-stored Next and Previous Index in the row matches the Chunk order of appearance in the input string, and update the Partial Match flag accordingly. In case of a Null Index for a Previous or/and Next index the corresponding verification will not be done. Additionally, the Chunk Data is stored, so that the Match Logic may be designed to verify whether the Input Chunk data really matches the Chunk data stored in the row of the Chunk Table. This can be used in the case of embodiments where the Chunk Data was not stored in the Hash Table, as explained before and shown in FIG. 6. Since several Chunks may have the same Index, then there may be several possible values for the Chunk Data. In that case, the existence of several possible data will be marked, for example by a Null value. Such a Null value will cause the Match Logic, during the searching phase, to skip the verification of the Chunk data. The function of the Match Logic will be explained in more details later.

Figure 11:
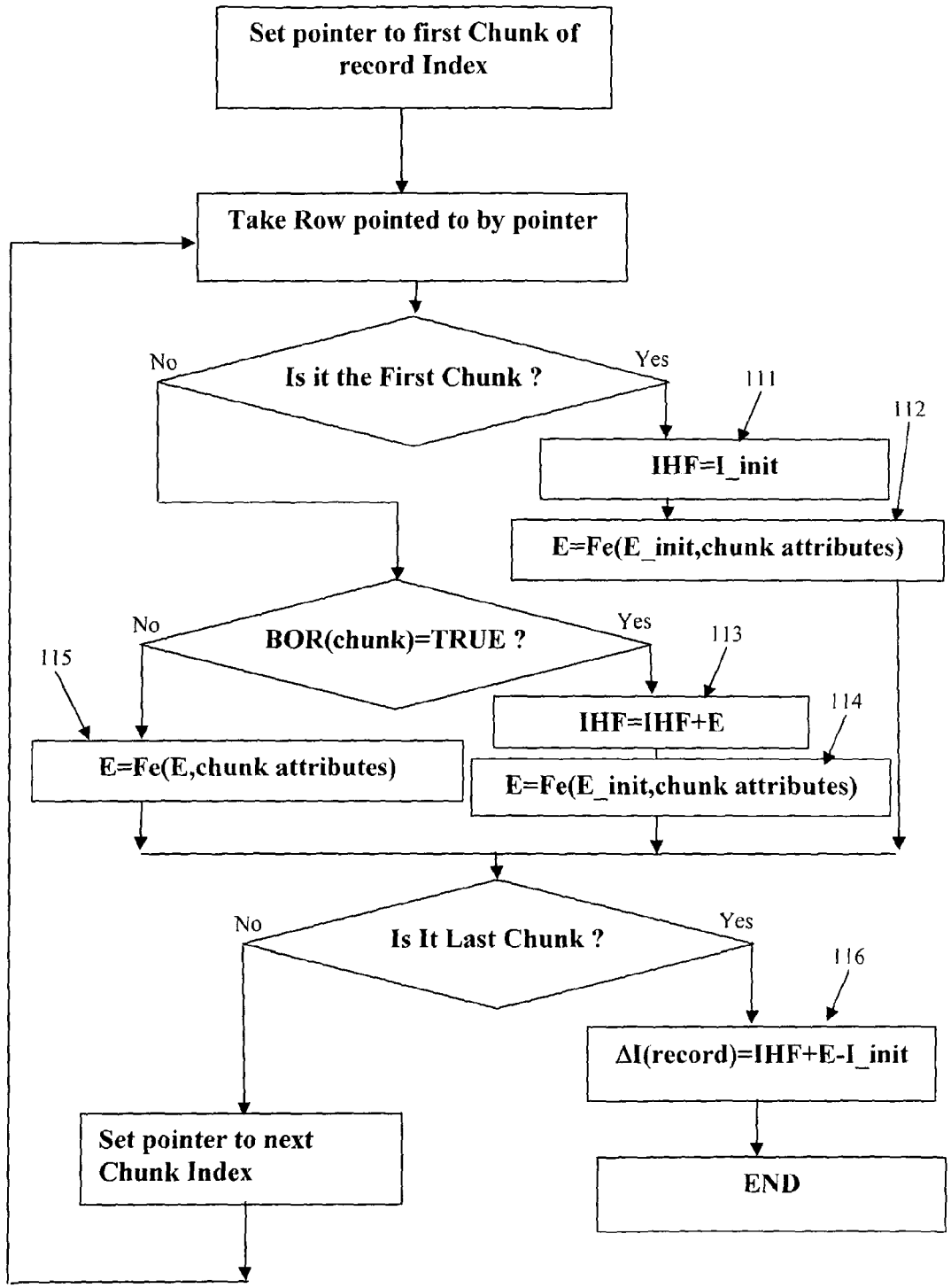
FIG. 11 shows a flow chart for the calculation, in the preparation phase, of an Incremental Hash Function variation for a record.

In FIG. 11 is shown a Flow chart that describes the calculation, during the preparation phase, of the $\Delta I$ value for a given record. Prior to executing this calculation, all the Chunks of all records are scanned in a first step of the preparation phase, and the corresponding rows in the Chunk Table are marked with a BOR flag in the event that the particular Chunk is the first Chunk of a record. In a similar way an EOR flag is set for chunks that are the last Chunk of a record. Attributes of the chunks are also evaluated and stored in the Chunk Table at rows with an EOR flag set, with the exception of the set of verification values such as length and $\Delta I$ that will be calculated in a second step of the preparation phase.

The calculation of $\Delta I$ uses a Hash value E and a Hash function Fe (E, Chunk attributes), which is a function of both a previous value of E and of the Chunk attributes. Chunk attributes may be any value associated with Chunk, like for example, Chunk data, Chunk index, next_index, previous_index. The Hash function Fe can be of any type. Its purpose is to produce, for each record section, a value that is as unique as possible. The dependence of Fe on previous value of E is optional, and is preferably used in order to improve the dispersion of the Hash values for the Hash function.

During the said second step of preparation phase, and after all Chunks have been checked for BOR flag and other attributes, each record is scanned again in order to calculate the $\Delta I$ value to be stored in the row of the Chunk Table pointed to by the index of the last Chunk of that record. The Flow Chart of FIG. 11 describes the steps of the calculation of $\Delta I$ value for a specific record. The values "E_init" and I_nit shown in the block diagram indicate specific predefined values used to initialize the Fe function. For each chunk, starting from the first chunk of the record, the attributes stored in the corresponding row of the chunk table are used to calculate a hash E value, and an Incremental Hash Function value (IHF). The calculation of the E and IHF values is executed in different ways depending on whether the Chunk is the first chunk of the record, the First chunk of another record, or is not the first chunk of any record.

In case it is the first chunk of the record, then IHF is initialized to the I_init value (block 111), and the E function is calculated using the E_init as previous value, (block 112).

In case it is the first chunk of another record, the E value is first added to the IHF value (block 113), then the E value is calculated using E_init as previous value In other cases, IHF is not changed, and the E value is calculated using its previous value (block 115)

Whenever the last chunk of the record is reached, $\Delta I$ is calculated as $\Delta I = IHF + E - I\_nit$ (block 116).

This particular embodiment uses the addition operation; however other mathematical operations "op" can be used using the same principle, as for example multiplication. Any "op" operation should satisfy the condition that an inverse operation "Iop" exists that allows the calculation of the difference of values of the IHF between the last and first chunk of the record. Mathematically, this can be expressed in the following way:

E1,E2, . . . En represent a set of arbitrary values

I0 represents an arbitrary value $$\Delta I = (((\ldots (I0\ op\ E1)\ op\ E2)\ op\ E3 \ldots)\ op\ En)\ Iop\ I0$$

Operation "op" satisfies the condition for $\Delta I$ calculation if the $\Delta I$ calculated above, for a given set of E1,E2 . . . En, is invariant with any possible value of the I0 for which the inverse operation "Iop" is defined.

After the $\Delta I$ function has been calculated for this record, it is stored in the Chunk table row pointed to by the index of the last chunk of that record, together with the record length and possibly additional verification values for that record.

Therefore, for each row pointed by the last chunk of a record, there will be one set of verification values per each record having a last chunk pointing to that row.

Figure 12:
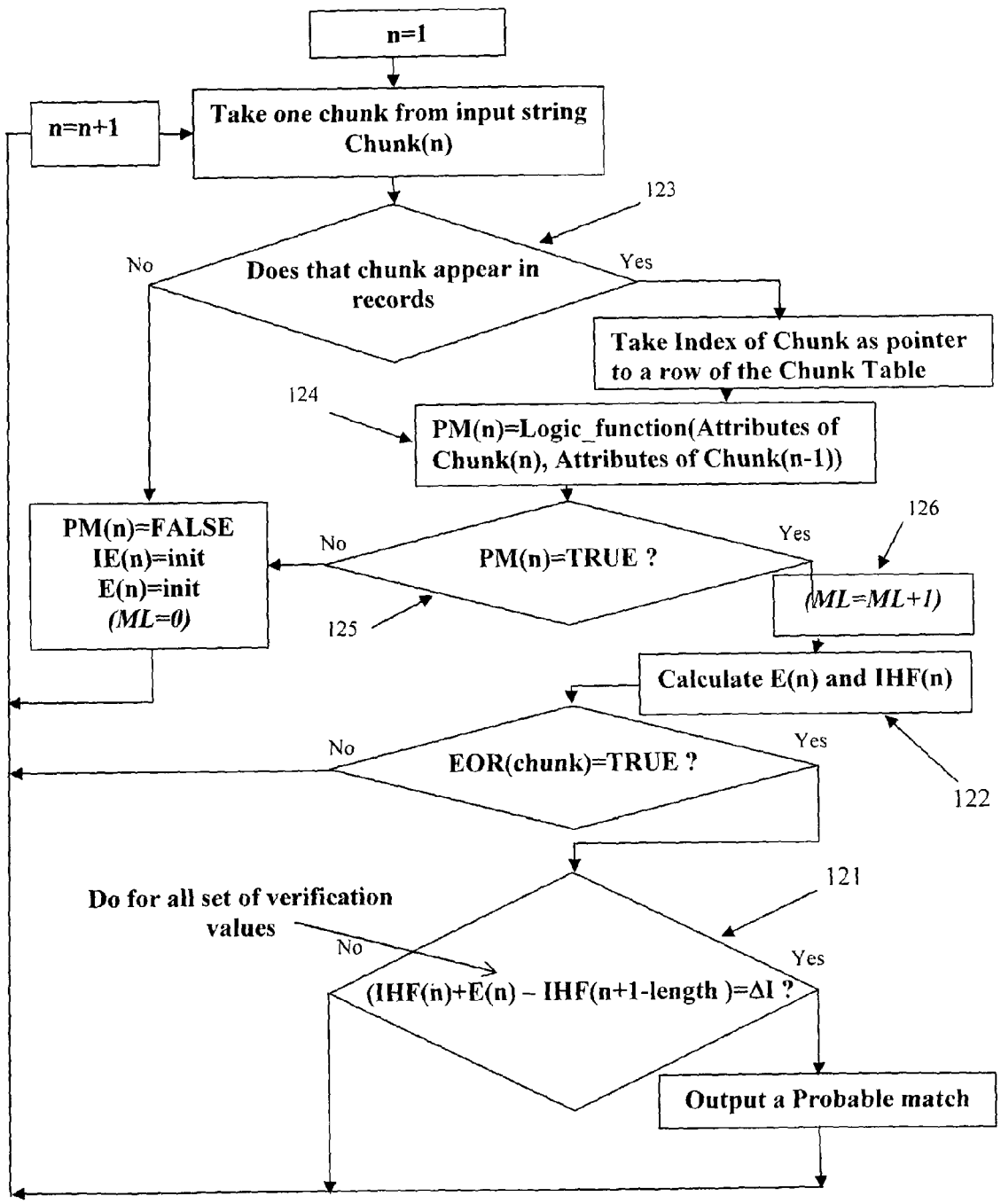
FIG. 12 shows a flow chart for the logic operations of the system.

In FIG. 12 is shown a possible Flow Chart describing the searching method used in the previously described embodiments. The input string Chunks are checked one by one, n being the Chunk number in the input string. The chunk searcher executes a search for that chunk, and returns an index if that chunk exists in at least one record (block 123). The match logic performs the following operation:

a)_calculates a Partial Match flag, PM(n) for that Chunk Number. This operation is shown in block (124), and will be shown in details below.

b)_Whenever a row of the Chunk Table having an EOR set is reached, optionally, a match length counter ML (block 126), that indicates the number of consecutive chunks with a partial match set is updated. Then hash values E and IHF are calculated (block 122); this calculation will be described below.

c)_Following b)_if the chunk has an EOR attribute, for each set of verification values (ΔI and length), the Match logic will check for a probable match in the following way:

the difference between the values of IHF at the present chunk, and at the "length" previous chunk is compared with the ΔI value stored at that row, using the formula (block 121)

$$\Delta I = ?IHF(n) + E(n) - IHF(n+1-\text{length})$$

If equality is verified, then a probable match is set. Optionally, an additional check is performed by using a Match Length ML. Every time a Partial Match is set, ML is increased by one. If the Partial Match is not set, then the ML is reset to zero.

Whenever a row of the Chunk Table having an EOR set is reached, before comparison of the variation of the IHF function, it is checked whether ML is larger or equal to the record length. This additional checking reduces the probability of false alarms. The calculation details of the IHF(n) and E(n) values shown in block (122) are detailed in FIG. 13.

In the following we shall describe options for the Logic_ function used to update the Partial Match flag PM(n).

PM(n) designates the Partial Match flag at Chunk n of the Input String

BOR(index), EOR(index) are the flags set at the row of the Chunk Table pointed to by index BOR(n), EOR(n) are the same flags that were retrieved from the Hash table in the embodiment described in FIG. 7.

In a simple implementation the logic_function always sets a Partial Match. Since the logic_function is applied whenever the chunk is found at least once in the records, then a Partial Match is set in all cases where the chunk is found at least once in the records.

In the following will be shown enhanced embodiments with more elaborated logic_functions, each having additional conditions that reduce the probability of a Partial Match, and thus the probability of a false alarm.

In a second simple implementation, the logic_function sets the Partial Match if Partial Match was set at a previous cycle, or if the row pointed to by the Chunk index has a BOR flag set:

$$PM(n) = (PM(n-1)==1) \text{ OR } (BOR(\text{index}(n))==1)$$

or $$PM(n) = (PM(n-1)==1) \text{ OR } (BOR(n)==1)$$

More elaborated logic functions can be used in order to reduce the probability of False Alarms. Following below are examples of logic functions using Next_index, Previous_index and Chunk data. In the following logic_function formulae, index(n) designates the index of the Chunk n of the input string, defined when that chunk has been found to appear in one of the records. PM(n) is the partial match flag, BOR (index(n)) is the BOR flag at the row pointed to by index(n).

Example 1, using Next_index: partial match is set only if the present chunk has the same index as the Next_index attribute of the previous chunk:

```
PM(n)=   (BOR(index(n))==1)
    OR (         (PM(n-1)==1)
            AND (      (Next_Index==0)
                  OR (Next_index(n-1)==index(n))
                )
       )
or
PM(n)=   (BOR(n)==1)
    OR (         (PM(n-1)==1)
            AND (      (Next_Index(n-1)==0)
                  OR (Next_index(n-1)==index(n))
                )
       );
```

Example 2, using Previous_index:

```
PM(n)=   (BOR(index(n))==1)
    OR (         (PM(n-1)==1)
            AND (      (Previous_Index(n)==0)
                  OR (Previous_index(n)==index(n-1))
                )
       );
or
PM(n)=   (BOR(n)==1)
    OR (         (PM(n-1)==1)
            AND (      (Previous_Index(n)==0)
                  OR (Previous_index(n)==index(n-1))
                )
       );
```

Example 3, using both Next_index and Previous_index: partial match is set if the

```
PM(n)=   (BOR(index(n))==1)
    OR (   (PM(n-1)==1)
        AND (   (Previous_Index(n)==0)
             OR (Previous_index(n)==index(n-1))
            )
        AND (   (Next_Index(n-1)==0)
             OR (Next_index(n-1)==index(n))
            )
       );
or
PM(n)=   (BOR(n)==1)
    OR (   (PM(n-1)==1)
        AND (   (Previous_Index(n)==0)
             OR (Previous_index(n)==index(n-1))
            )
        AND (   (Next_Index(n-1)==0)
             OR (Next_index(n-1)==index(n))
            )
       );
```

Example 4, using both Next_index, Previous_index and Chunk data

```
PM(n)=   (BOR(index(n))==1)
    OR (   (PM(n-1)==1)
        AND (   (Previous_Index(n)==0)
             OR (Previous_index(n)==index(n-1))
            )
        AND (   (Next_Index(n-1)==0)
             OR (Next_index(n-1)==index(n))
            )
        AND ( Chunk(n) == Chunk_data(index(n)) )
       );
or
PM(n)=   (BOR(n)==1)
    OR (   (PM(n-1)==1)
```

```
        AND (    (Previous_Index(n)==0)
              OR (Previous_index(n)==index(n−1))
            )
        AND (    (Next_Index(n−1)==0)
              OR (Next_index(n−1)==index(n))
            )
        AND ( Chunk(n) == Chunk_data(index(n) ) )
      );
```

It must be understood that additional conditions or attributes of Chunks can be added to logic_function formulae in order to reduce the probability of a false alarm.

Figure 13:
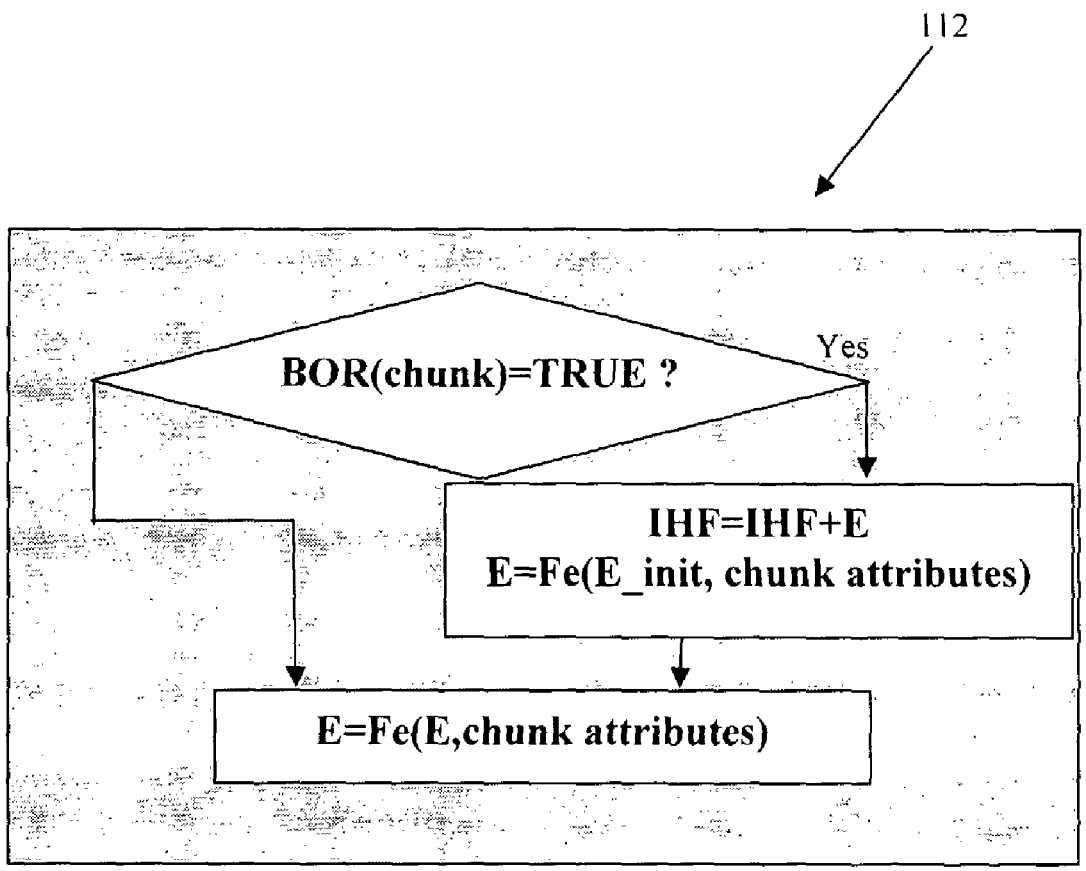
FIG. 13 shows how an incremental Hash function IH is calculated for an input string.

FIG. 13 shows the details of calculation of the values of IHF and E, mentioned in block 122 of FIG. 12.

Figure 14:
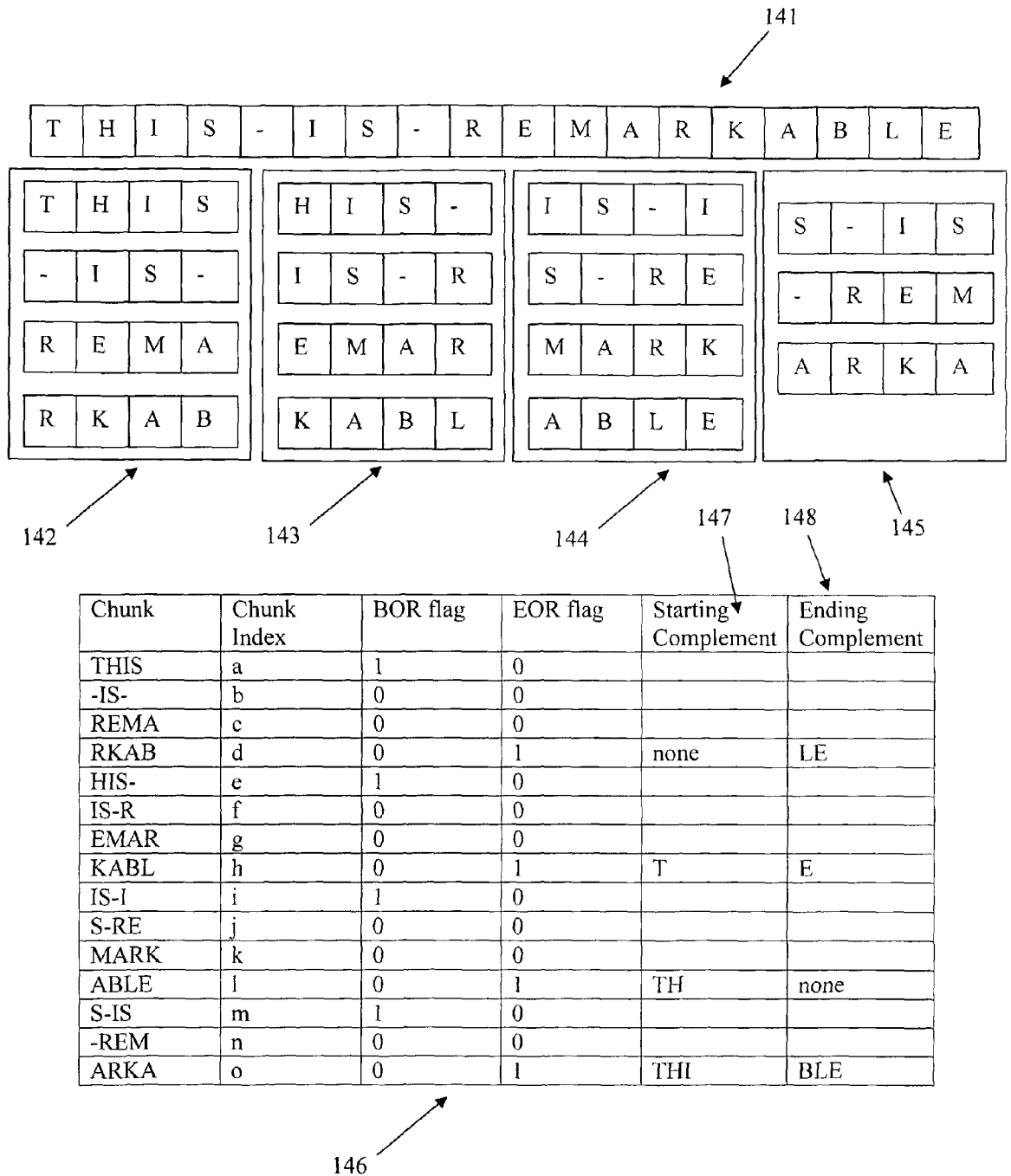
FIG. 14 shows how speed search may be accelerated by searching successive non overlapping chunks of the input data.

In FIG. 14, an option for a Chunk Representation of the records is shown that allows the search to skip the overlapping Chunks of the input string. In that implementation, the input strings are now divided in consecutive Chunks that do not have overlapping words, so that the number of Chunks checked is now divided by the number of words in a Chunk. However, if the same chunk representation as explained above is used, the first Chunk of the record may not be found, due to a possible mis-alignment. In order to avoid this problem, the record (141) is now stored in the Chunk table (146) in the form of n new record representations (142, 143, 144, 145), n being the number of words in a chunk—in this example n=4. Whenever the input string is searched, if it contains the record, then one of the four new record representations will be found, and a probable match can be asserted. At the EOR chunks of these new record representations, the "Missed" words, i.e. words that have been skipped, at start and/or end of record, because of the omission of the overlapping chunk, may be stored as complementary verification data in the Chunk Table, added to the set of verification values associated to each row for which an EOR is found. This is shown in the columns Starting Complement and Ending complement of the Chunk Table 146. During the Search Phase, if one of the new records is found, then the complementary data may also be compared to the correspondent input string data, and if that data is found matching, a probable match is issued with a lower probability of False Match. In FIG. 14 is shown an example of the new record representation, and the associated Chunk Table. As can be seen in the Chunk Table, for the record (141), there are 4 rows of the Chunk table for which the EOR flag is set.

In embodiments described above, the indexes can be assigned to chunks in any method. A further, improved method will be described herein below wherein these indexes are calculated using a hash function calculated in a similar way to the E function described above.

In the previously described embodiments, if several records have a common last chunk (EOR chunk), then whenever that chunk is found, possible match for all the records having that last chunk must be checked, using the list of indexes chained by the chain-index of the Chunk table. In the case where a large number of records have the same last chunk, then a considerable number of memory reading cycles must be executed for this Chunk, resulting in increased searching time. As will be shown, the improved embodiment overcomes that problem.

According to this embodiment, during a first preparation phase all Chunks are scanned and marked with BOR and EOR flags. During a second preparation phase, for each record a hash function value Ei is calculated, using a hash function Fei that is initialized at the last Chunk of that record marked by a BOR (BOR chunk) and preceding the EOR chunk, and that Fei function is calculated for all Chunks from that BOR Chunk (including) up to the EOR Chunk (including). The index assigned to the EOR chunk will then be calculated as another predefined function of the value of that E function, IEOR(Ei).

Consider a record "abcdefghij" wherein each letter designates a Chunk.

For example, EOR flag is set at j only, and BOR flag is set at "a", "d" and "g"

We define a hash function→Fei(Ei,chunk)

We calculate a hash E value at j:

$$E=Fe(Fe(Fe(Fe(init,g),h),i),j)$$

Then we calculate the index pointing to a row in the chunk table where the attributes of the Chunk j will be stored:

$$Index(j)=IEOR(Ei) \text{ for that record.}$$

The IEOR(E) can be any function. For example, it may consist of taking only a number of bits of the E value.

As can be seen, if several records have the same ending Chunk, then that chunk may be recorded in several rows of the Chunk table, since for each record a different E value may be found.

This is advantageously exploited during the searching phase. The index associated with a chunk of the input string is calculated using the same method, and if a chunk with EOR is encountered, then the IEOR(E) value will point to a row in the chunk table, and that row will have a great probability of being empty or not matching if the preceding chunks were not matching a record ending with that chunk, or it will contain the data of the record with the highest probability of match. In both cases, the probability of the existence of a chain-index at that row is considerably reduced, and the risk of the overall searching speed being reduced is also considerably reduced.

The Fei function may be of any type; in particular it can be selected to be the Fe function described above.

Further improvement can be obtained using a number p of such Ei functions, Ei1, Ei2 . . . Ein . . . Eip, where the Ei1 is identical to the Ei described above, and the Ein are calculated in the same manner but using Ei(n−1) as init value at each BOR.

During preparation phase, the number n designating the Ein function to be selected for index calculation is stored in the Hash table. Preferably, during that preparation phase, the maximum n value possible for each record will be selected. This will again reduce considerably the probability of the existence of a chain index in the Chunk table, and thus reduce the risk of a sporadic lower speed of search.

Referring to the previous example, and using the additional Eip function, with p=3 Ein values may be calculated as follows:

Record→abcdefghij

EOR set at chunk→j

BOR set at chunks→a, d, g

Hash function→Fei(Ei,chunk)

Ei1 is calculated in the same manner as shown above for E:

$$Ei1(c)=Fe(Fe(Fe(E\_init,a),b),c)$$

$$Ei1(f)=Fe(Fe(Fe(E\_init,d),e),f)$$

$$Ei1(j)=Fe(Fe(Fe(Fe(E\_init,g),h),i),j)$$

Ei2 is calculated in a similar manner, with the difference that the initial value used at chunks with BOR is set to the value of the Ei1 function at the previous chunk:

$$Ei2(f)=Fe(Fe(Fe(Ei(c),d),e),f) \quad 5$$

$$Ei2(j)=Fe(Fe(Fe(Fe(Ei1(f),g),h),i),j)$$

In the same manner Ei3 is calculated, using the Ei2 as initial value at BOR chunks:

$$Ei3(j)=Fe(Fe(Fe(Fe(Ei2(f),g),h),i),j)$$

Selecting Ei3($j$) for index for the j chunk will reduce the probability that the corresponding row of the chunk table will be pointed to by input strings that did not include the "abcdefghij" string, thus reducing the probability of a false alarm.

During compilation time, all records having the same ending chunk are checked. The number of BOR chunks of all these records is checked, and the Eip function is selected according to the smallest number. In the example above, if the smallest number is 1, Ei1 is selected; if it is 2, Ei2 is selected, and if it is greater than 2 Ei3 is selected.

The invention claimed is:

1. A method of detecting the inclusion of records in an input string of words comprising:
   a. pre-processing the records such that at least a portion of the records are represented by a string; said string comprising a plurality of sections wherein each of the said sections (chunks) comprises a pre-defined number of elementary words, in the manner that when a chunk is the first chunk in the chunk representation of a record a "Begin of Record" attribute is assigned to the first chunk and when a chunk is the last chunk in the chunk representation of a record, an "End of Record" attribute is assigned to the last chunk;
   b. searching said string in the manner that the input string is divided into a plurality of chunks and each of said chunks is searched in the records so that if a searched chunk is found to be present in at least one record, a Partial Match Flag is set according to a logic calculation; and,
   c. calculating an Incremental Hash Function (IHF) for each input chunk;
   characterized by that whenever a chunk from the input string is found to be in at least one of the records, and the said chunk is associated with an End of Record and the Partial Match is set for this chunk (End of Record chunk), the difference values between the value of the IHF at that "End of Record" chunk and the value of the IHF at each of the previous chunks of the said string, to which a "Begin of Record" is associated (Begin of Record Chunk), is calculated and compared with all pre-recorded values ΔI, calculated during the pre-processing for each record having the said End of Record chunk as last chunk, and associated to the said End of Record chunk;
   wherein calculating the Incremental Hash Function (IHF)includes:
   i. starting with an arbitrary initial value;
   ii. processing sequentially each chunk of the record; and,
   iii. calculating the IHF for each of said processed chunks as an arbitrarily first predefined function of the said chunk and the previously calculated IHF value where the said chunk has not been associated with a "Begin of Record" attribute, and as a reversible operation of a second predefined function of the said chunk and the previously calculated IHF value where the said chunk has been associated with a "Begin of Record" attribute;
   d. calculating a ΔI function for each record as the inverse of the said reversible operation of the IHF value at the last chunk of the record, and the said initial value of the IHF for that record;
   e. associating to each chunk having an "End of Record" attribute, the values of all ΔI function for all records for which that chunk is the last chunk;
   f. representing the input string as a string of chunks (input string of chunks);
   h. processing sequentially each chunk of the said input string of chunks, and for each said chunk setting a Partial Match Flag if the said chunk appears in the said list of chunks and if either the said Chunk has a "Begin of Record" attribute, or the Partial Match Flag was previously set;
   if said chunk has an "End of Record" attribute, calculating a set of ΔJ function values, each one being the result of the inverse of the said reversible operation of the IHF value at the said chunk of the input string of chunks, and the IHF value obtained immediately before calculating the IHF for a chunk having a "Begin of Record" attribute; and
   g. asserting a "Probable Match" in case the said chunk has an "End of Record" attribute and at least one of the ΔJ functions from the said set of ΔJ functions equals one of the ΔI functions associated to the said chunk wherein a "Probable Match" indicates a high probability that at least one record is included in the input string.

2. The method according to claim 1, wherein at least a portion of the records are words, numbers, notes, characters or any combination thereof.

3. The method of claim 1, wherein a conventional Hash function and a Hash table is used to check whether a sequentially processed chunk of the input string of chunks is present in the chunk table, the Hash table comprising a data field and a chain index field for the purpose of finding an exact match between the said sequentially processed chunk and a chunk of the chunk table.

4. The method of claim 1, wherein a simplified Hash table is used for checking whether a sequentially processed chunk of the input string of chunks is present in the chunk table, characterized in that the Hash table does not comprise a data field, all chunks having the same Hash function point to the same row, and a chunk is assumed to be present in the chunk table if the hash function of that chunk points to a non empty row of the hash table, wherein the Begin of Record attribute is set and stored in the Hash table row if one chunk of the list of chunks has a Hash function pointing to that row and is the first chunk of one record, and wherein an End of Record attribute is set and stored in the Hash table if one chunk of the list of chunks has a hash function pointing to that row and is the last chunk of one record.

5. The method of claim 1, wherein additional attributes are associated to each chunk of the list of chunks, the said additional attributes representing specific values or properties of each chunk in a record, the said additional attributes having a specific "null" value if a particular chunk has different attribute values in different records, and wherein a Partial Match for a sequentially processed chunk is set if the said chunk appears in the said list of chunks and if either the said Chunk has a "Begin of Record" attribute, or if a Partial Match Flag was set for a previous sequentially processed chunk and an additional logic relation of the attributes of the sequentially processed chunk and the previous sequentially processed chunk is verified.

6. The method of claim 5 wherein additional attributes are associated to each row of the Hash table, the said additional attributes representing specific values or properties of each chunk in a record, the said additional attributes having a specific "null" value if a particular row has different attribute values correspondent to several chunks having a hash function pointing to that row, and wherein the Partial Match is set if the hash function of the said chunk points to a valid row of the hash table and if either the said row has a "Begin of Record" attribute, or if the Partial Match Flag was previously set and an additional logic relation of the attributes of the rows pointed to by the hash functions of the sequentially processed chunk and the previous sequentially processed chunk is verified.

7. The method of claim 6 wherein the additional attributes are the previous and next chunk in the record.

8. The method of claim 7, wherein the additional attributes at a row of the hash table are the hash functions of the preceding chunk and the consecutive chunk to the chunk of a record having a hash function pointing to that row.

9. The method of claim 1, wherein chunks of the chunk representation of records are not overlapping, and where starting complementary and ending complementary data are used to verify final Partial match.

10. The method of claim 1, wherein the ΔI function for each record is obtained by calculating the inverse of a reversible operation of the IHF value at the last chunk of the record, and the initial value of the IHF for that record.

11. The method of claim 10 wherein the reversible operation is addition.

12. The method of claim 10 wherein the reversible operation is multiplication.

13. The method of claim 10 wherein the reversible operation is division.

14. A method of detecting the inclusion of at least one record comprising string of words from a list of pre-defined records in an input string of words, comprising:
  A. pre-processing the list of records in the manner that each record is represented by a string comprising a plurality of sections wherein each of the said sections (chunks) comprises a pre-defined number of elementary words, creating a list of chunks, comprising all chunks of said pre-defined records, wherein if a chunk appears in more than one record this chunk is included only once in the said list of chunks;
  B. associating to each chunk a "Begin of Record" attribute whenever the said chunk is the first chunk in the chunk representation of a record;
  C. associating to each chunk a "End of Record" attribute whenever the said chunk is the last chunk in the chunk representation of a record;
  D. calculating for each record an Incremental Hash Function (IHF); said calculating compromising:
    i. starting with an arbitrary initial value;
    ii. processing sequentially each chunk of the record; and,
    iii. calculating the IHF for each of said processed chunks as an arbitrarily first predefined function of the said chunk has not been associated with a "Begin of Record" attribute, and as a reversible operation of a second predefined function of the said chunk and the previously calculated IHF value where the said chunk has been associated with a "Begin of Record" attribute;
  E. calculating ΔI function for each record as the inverse of the said reversible operation of the IHF value at the last chunk of the record, and the said initial value of the IHF for that record;
  F. associating to each chunk having an "End of Record" attribute, the values of all ΔI function for all records for which that chunk is the last chunk;
  G. representing the input string as a string of chunks (input string of chunks);
  H. processing sequentially each chunk of the said input string of chunks, and for each said chunk setting a Partial Match Flag if the said chunk appears in the said list of chunks and if either the said Chunk has a "Begin of Record" attribute, or the Partial Match Flag was previously set;
  I. if said chunk has an "End of Record" attribute, calculating a set of ΔJ function values, each one being the result of the inverse of the said reversible operation of the IHF value at the said chunk of the input string of chunks, and the IHF value obtained immediately before calculating the IHF for a chunk having a "Begin of Record" attribute; and,
  J. asserting a "Probable Match" in case the said chunk has an "End of Record" attribute and at least one of the &J functions from the said set of ΔJ functions equals one of the ΔI functions associated to the said chunk wherein a "Probable Match" indicates a high probability that at least one record is included in the input string.

15. The method according to claim 14, wherein at least a portion of the records comprises words, numbers, notes, characters or any combination thereof.

16. The method according to claim 14, wherein a conventional Hash function and a Hash table is used to check whether a sequentially processed chunk of the input string of chunks is present in the chunk table, the Hash table comprising a data field and a chain index field for the purpose of finding an exact match between the said sequentially processed chunk and a chunk of the chunk table.

17. The method according to claim 14 wherein a simplified Hash table is used to check whether a sequentially processed chunk of the input string of chunks is present in the chunk table, characterized in that the Hash table does not comprise a data field, all chunks having the same hash function point to the same row, and a chunk is assumed to be present in the chunk table if the hash function of that chunk points to a non empty row of the hash table, wherein the Begin of Record attribute is set and stored in the Hash table row if one chunk of the list of chunks has a hash function pointing to that row and is the first chunk of one record, and wherein an End of Record attribute is set and stored in the Hash table if one chunk of the list of chunks has a hash function pointing to that row and is the last chunk of one record.

18. The method according to claim 14, wherein a conventional Hash function and a Hash table is used with additional attributes associated to each chunk of the list of chunks, the said additional attributes representing specific values or properties of each chunk in a record, the said additional attributes having a specific "null" value if a particular chunk has different attribute values in different records, and wherein the Partial Match is set if the said chunk appears in the said list of chunks and if either the said Chunk has a "Begin of Record" attribute, or if the Partial Match Flag was previously set and an additional logic relation of the attributes of the sequentially processed chunk and the previous sequentially processed chunk is verified.

19. The method according to claim 14 wherein a conventional Hash function and a Hash table is used with additional attributes associated to each row of the hash table, the said additional attributes being the previous and next chunk in the record.

20. The method according to claim 14 wherein chunks of the chunk representation of records are not overlapping, and where starting complementary and ending complementary data are used to verify final Partial match.

21. The method according to claim 14 wherein the reversible operation is addition.

22. The method according to claim 14 wherein the reversible operation is multiplication.

23. The method according to claim 14 wherein the reversible operation is division.

24. The method of claim 17 wherein chunks of the chunk representation of records are not overlapping, and where starting complementary and ending complementary date are used to verify final Partial match.

25. The method according to claim 17 wherein the reversible operation is addition.

26. The method according to claim 17 wherein the reversible operation is multiplication.

27. The method according to claim 17 wherein the reversible operation is division.

28. A system for detecting the inclusion of strings of records in an input string of words comprising:
   a dedicated hardware;
   a. means, executed by the dedicated hardware, for pre-processing the records such that at least a portion of the records are represented by a string; said string comprising a plurality of sections (chunks) wherein each of the said sections comprises a pre-defined number of elementary words, in the manner that when a chunk is the first chunk in the chunk representation of a record a "Begin of Record" attribute is assigned to the first chunk and when a chunk is the last chunk in the chunk representation of a record, an "End of Record" attribute is assigned to the last chunk;
   b. means, executed by the dedicated hardware, for searching said string in the manner that the input string is divided into a plurality of chunks, and each of said chunks is searched in the records so that if a searched chunk is found to be present in at least one record, a Partial Match Flag is set according to a logic calculation;
   c. means, executed by the dedicated hardware, for calculating and Incremental Hash Function (IHF) for each input chunk; and
   d. means, executed by the dedicated hardware, for calculating all pre-recorded values ΔI wherein whenever a chunk from the input string is found to be in at least one of the records, and the said chunk is associated with an End of Record and the Partial Match is set for this chunk (End of Record chunk), the difference values between the value of the IHF at that "End of Record" chunk and the value of the IHF at each of the previous chunks of the said string, to which a "Begin of Record" is associated (Begin of Record chunk), is calculated and compared with all pre-recorded values ΔI, calculated during the pre processing for each record having the said End of Record chunk as last chunk, and associated to the said End of Record chunk; and further wherein said means for calculating as set forth in (c) is adapted to make its calculation by
   i. starting with an arbitrary initial value;
   ii. processing sequentially each chunk of the record; and,
   iii. calculating the IHF for each of said processed chunks as an arbitrarily first predefined function of the said chunk has not been associated with a "Begin of Record" attribute, and as a reversible operation of a second predefined function of the said chunk and the previously calculated IHF value where the said chunk has been associated with a "Begin of Record" attribute; and
   said means for calculating as set forth in (d) is adapted to calculating said ΔI function for each record as the inverse of the said reversible operation of the IHF value at the last chunk of the record, and the said initial value of the IHF for that record;
   said means (c) and (d) being further adapted to associate to each chunk having an "End of Record" attribute, the values of all ΔI function for all records for which that chunk is the last chunk;
   said means representing the input string as a string of chunks (input string of chunks);
   said means processing sequentially each chunk of the said input string of chunks, and for each said chunk setting a Partial Match Flag if the said chunk appears in the said list of chunks and if either the said Chunk has a "Begin of Record" attribute, or the Partial Match Flag was previously set;
   if said chunk has an "End of Record" attribute, calculating a set of ΔJ function values, each one being the result of the inverse of the said reversible operation of the IHF value at the said chunk of the input string of chunks, and the IHF value obtained immediately before calculating the IHF for a chunk having a "Begin of Record" attribute; and,
   asserting a "Probable Match" in case the said chunk has an "End of Record" attribute and at least one of the ΔJ functions from the said set of ΔJ functions equals one of the ΔI functions associated to the said chunk wherein a "Probable Match" indicates a high probability that at least one record is included in the input string.

* * * * *